United States Patent
Yamamoto et al.

(10) Patent No.: US 10,302,126 B2
(45) Date of Patent: May 28, 2019

(54) BEARING DEVICE FOR WHEELS

(71) Applicant: NTN CORPORATION, Osaka-shi (JP)

(72) Inventors: Kazunari Yamamoto, Iwata (JP); Tomoko Baba, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/751,559

(22) PCT Filed: Aug. 1, 2016

(86) PCT No.: PCT/JP2016/072491
§ 371 (c)(1),
(2) Date: Feb. 9, 2018

(87) PCT Pub. No.: WO2017/026311
PCT Pub. Date: Feb. 16, 2017

(65) Prior Publication Data
US 2018/0231054 A1   Aug. 16, 2018

(30) Foreign Application Priority Data
Aug. 10, 2015   (JP) .................................. 2015-158423

(51) Int. Cl.
*B60B 35/02* (2006.01)
*B60B 35/14* (2006.01)
(Continued)

(52) U.S. Cl.
CPC .......... *F16C 19/18* (2013.01); *B60B 27/0005* (2013.01); *B60B 35/02* (2013.01);
(Continued)

(58) Field of Classification Search
CPC ...... F16C 19/18; F16C 33/58; F16C 2326/02; B60B 29/001; B60B 27/005; B60B 27/0094; B60B 35/18; F16D 3/223
(Continued)

(56) References Cited

U.S. PATENT DOCUMENTS 2,978,265 A * 4/1961 Cluff ........................ F16D 1/10
                                                     403/338
4,118,080 A * 10/1978 Kregler ................ F16C 19/187
                                                     384/482
(Continued)

FOREIGN PATENT DOCUMENTS

FR          2969237 A1 * 6/2012 ............ F16C 33/768
JP       2000-130444       5/2000
(Continued)

OTHER PUBLICATIONS

International Search Report (ISR) dated Sep. 13, 2016 in International (PCT) Application No. PCT/JP2016/072491.

*Primary Examiner* — Marcus Charles
(74) *Attorney, Agent, or Firm* — Wenderoth, Lind & Ponack, L.L.P.

(57) ABSTRACT

A bearing device for wheels is configured so as to reduce an amount of deformation of an opening of an outer member while minimizing an increase in overall weight, thus preventing a deterioration in rolling fatigue life. The bearing device for wheels is provided with an outer member having double-row outer rolling surfaces, a hub ring having a wheel mounting flange and having a small-diameter stepped section, and an inner member constituted by at least one inner ring press-fitted over the small-diameter stepped section, the inner member having double-row inner rolling surfaces facing the double-row outer rolling surfaces. A band-shaped section having a predetermined band width and protruding radially by a protrusion amount is formed on at least a part of the wheel mounting flange-side outer peripheral portion of the opening of the outer member.

6 Claims, 8 Drawing Sheets

(51) Int. Cl.
  *F16C 19/18* (2006.01)
  *B60B 27/00* (2006.01)
  *F16C 33/58* (2006.01)
  *B60B 35/18* (2006.01)
  *F16C 33/78* (2006.01)

(52) U.S. Cl.
  CPC .............. *B60B 35/18* (2013.01); *F16C 33/58* (2013.01); *F16C 33/585* (2013.01); *F16C 33/7876* (2013.01); *B60B 35/14* (2013.01); *F16C 19/186* (2013.01); *F16C 33/7883* (2013.01); *F16C 2326/02* (2013.01)

(58) Field of Classification Search
  USPC ............... 384/476, 504, 544, 559, 561, 589; 464/901; 403/338, 373, 376
  See application file for complete search history.

(56) References Cited

U.S. PATENT DOCUMENTS

| | | | | |
|---|---|---|---|---|
| 4,372,628 A | * | 2/1983 | Kiener | B60B 27/0005 384/476 |
| 4,545,692 A | * | 10/1985 | Bras | B60B 27/0005 384/477 |
| 4,981,390 A | * | 1/1991 | Cramer, Jr. | F16D 1/0835 403/355 |
| 5,389,044 A | * | 2/1995 | Bandy, Jr. | B65G 23/06 474/152 |
| 5,607,241 A | * | 3/1997 | Fukumura | B60B 27/0005 384/537 |
| 5,664,806 A | * | 9/1997 | Vortmeyer | B62D 1/192 280/777 |
| 6,368,223 B1 | * | 4/2002 | Ouchi | B60B 27/00 464/145 |
| 7,007,386 B1 | * | 3/2006 | Stover | F16C 27/04 29/898.07 |
| 7,832,942 B2 | | 11/2010 | Komori et al. | |
| 2003/0102711 A1 | * | 6/2003 | Vignotto | B60B 27/02 301/35.627 |
| 2009/0154864 A1 | | 6/2009 | Komori et al. | |

FOREIGN PATENT DOCUMENTS

| | | | |
|---|---|---|---|
| JP | 2005-17251 | 1/2005 | |
| JP | 2008-155837 | 7/2008 | |
| WO | WO-2009123254 A1 * | 10/2009 | ......... B60B 27/0005 |

* cited by examiner

BEARING DEVICE FOR WHEELS

TECHNICAL FIELD

The present invention relates to a bearing device for wheels. In particular, the present invention relates to a bearing device for wheels with improved life duration of its outer member.

BACKGROUND ART

Conventionally, there is known a bearing device for wheels that rotatably supports a wheel in a suspension device for an automobile or the like. In the bearing device for wheels, a hub ring connected to the wheel is rotatably supported by an outer member via rolling elements. The bearing device for wheels is secured to a knuckle of a vehicle via a mounting flange of the outer member. In other words, the bearing device for wheels rotatably supports the hub ring connected to the wheel in a state in which the outer member is secured to the knuckle of the vehicle. For the bearing device for wheels, a multi-row angular contact ball bearing with desired bearing stiffness and low rotary torque in view of improvement of fuel consumption is most commonly used. The bearing device for wheels configures the angular contact ball bearing by giving a predetermined contact angle to the rolling elements to thus cause the rolling elements to be brought into contact with the outer member and the hub ring. The outer member of the bearing device for wheels is provided with rolling surfaces for rows of the rolling elements, near an opening on a side of a wheel mounting flange of the hub ring (outer side) and near an opening on a side of a mounting flange of the outer member (inner side). The outer member supports a load from the wheel with the rolling surfaces via the rolling elements that support the hub ring.

In such a bearing device for wheels, when the vehicle stops or moves forward or backward, a load from the vehicle works on the substantially center of the multi-row angular contact ball bearing. On the other hand, when the vehicle turns, a radial load and an axial load exerted on the wheel on a side opposite to a turning direction (a left side of the vehicle when the vehicle turns right) increase. Thus, some bearing devices for wheels increase bearing stiffness by improving stiffness of the row of rolling elements on the outer side to thus prevent deterioration in rolling fatigue life. One example is described in Patent Document 1.

In the bearing device for wheels described in Patent Document 1, the number of rolling elements in a row of rolling elements on an outer side is increased by setting a pitch diameter of the row of rolling elements on the outer side to be larger than a pitch diameter of a row of rolling elements on an inner side, out of multiple rows of rolling elements, and thus stiffness of the row of rolling elements is improved. However, according to this bearing device for wheels, as the pitch diameter of the row of rolling elements on the outer side is increased, a diameter of an opening of the outer member on the outer side is also increased. Further, each opening of the outer member includes a fitting portion for providing a sealing member that prevents rain water or the like from entering into the outer member, a reference surface for processing, and the like. Therefore, the bearing device for wheels has possibilities that, when the radial load or the axial load applied to the rolling surface of the outer member on the outer side increases due to turning movement of the vehicle, the opening on the outer side, which is apart from the mounting flange secured to the knuckle, can deform into a substantial elliptical shape, leading to deterioration of roundness of the rolling surface and to a decrease in the rolling fatigue life.

PRIOR ART DOCUMENTS

Patent Documents

Patent Document 1: JP-A 2008-155837 Gazette

SUMMARY OF THE INVENTION

Problems to be Solved by the Invention

The present invention is made in view of the above circumstances, and aims to provide a bearing device for wheels capable of reducing an amount of deformation of an opening of an outer member while minimizing an increase of an overall weight, and thus preventing deterioration in rolling fatigue life.

Solutions to the Problems

A bearing device for wheels according to the present invention includes: an outer member having a vehicle body mounting flange integrally along an outer periphery, and a multi-row outer rolling surface along an inner periphery; an inner member having a hub ring and at least one inner race, the hub ring having a wheel mounting flange for attachment to a wheel integrally at one end and a small-diameter stepped portion extending axially around an outer periphery, the at least one inner race being press-fitted into the small-diameter stepped portion, the outer periphery being provided with a multi-row inner rolling surface facing the multi-row outer rolling surface; and multi-row rolling elements disposed in a rollable manner between the multi-row inner rolling surface and the multi-row outer rolling surface, in which a belt-like portion having a predetermined width and extending in a radial direction is provided for at least a part of an outer peripheral portion of an opening of the outer member on a side of the wheel mounting flange.

Preferably, the bearing device for wheels according to the present invention is configured such that the belt-like portion is configured by press-fitting a circular ring into the opening of the outer member, the circular ring having an inner diameter smaller than an outer diameter of the opening of the outer member.

Preferably, the bearing device for wheels according to the present invention is configured such that the belt-like portion is configured by fitting a circular ring having fastening means into the opening of the outer member and securing the circular ring to the opening of the outer member by the fastening means, the circular ring being partially open, the fastening means bringing ends of the circular ring close to each other.

Preferably, the bearing device for wheels according to the present invention is configured such that the belt-like portion is configured by fitting a circular ring having fastening means into the opening of the outer member and securing the circular ring to the opening of the outer member by the fastening means, the circular ring being divided into a plurality of parts, the fastening means bringing ends of the parts of the circular ring close to each other.

Effects of the Invention

According to the bearing device for wheels of the present invention, only the thickness of an arbitrary portion of the opening of the outer member is increased. With this, it is possible to reduce the amount of deformation of the opening of the outer member while minimizing the increase of the overall weight, and thus to prevent deterioration in rolling fatigue life.

According to the bearing device for wheels of the present invention, the thickness of the opening is increased by the belt-like portion of an arbitrary shape without considering the shape or the processing method of the outer member. With this, it is possible to reduce the amount of deformation of the opening of the outer member while minimizing the increase of the overall weight, and thus to prevent deterioration in rolling fatigue life.

According to the bearing device for wheels of the present invention, it is possible to detachably attach a member to an arbitrary portion of the outer member without considering the shape or the processing method of the outer member. With this, it is possible to reduce the amount of deformation of the opening of the outer member while minimizing the increase of the overall weight, and thus to prevent deterioration in rolling fatigue life.

EMBODIMENTS OF THE INVENTION

Hereinafter, with reference to FIGS. 1 and 2, a bearing device for wheels 1 as a first embodiment of a bearing device for wheels 1 according to the present invention will be described.

Figure 1:
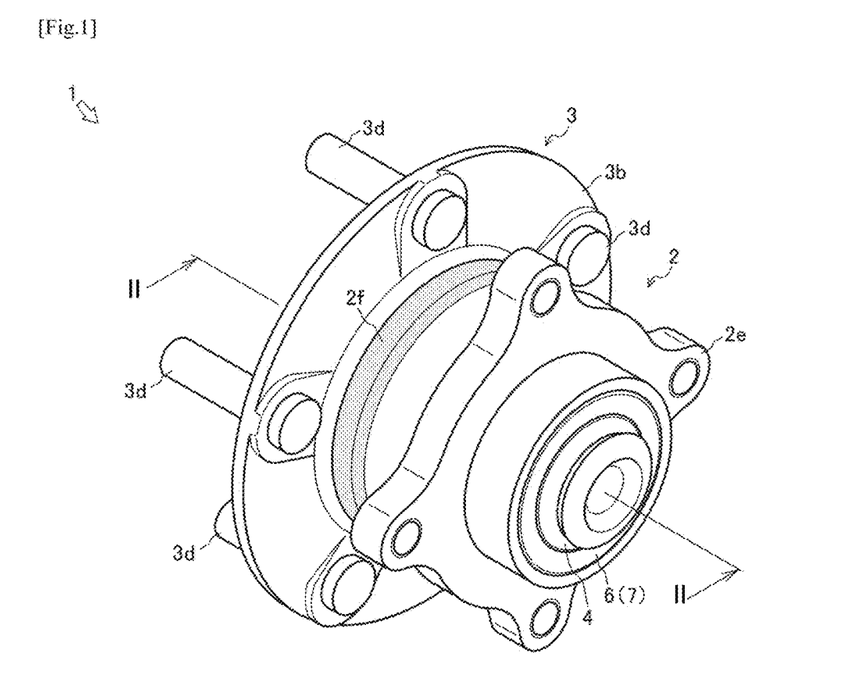
FIG. 1 is a perspective view illustrating an overall configuration of a bearing device for wheels of a first embodiment according to the present invention.
Figure 2:
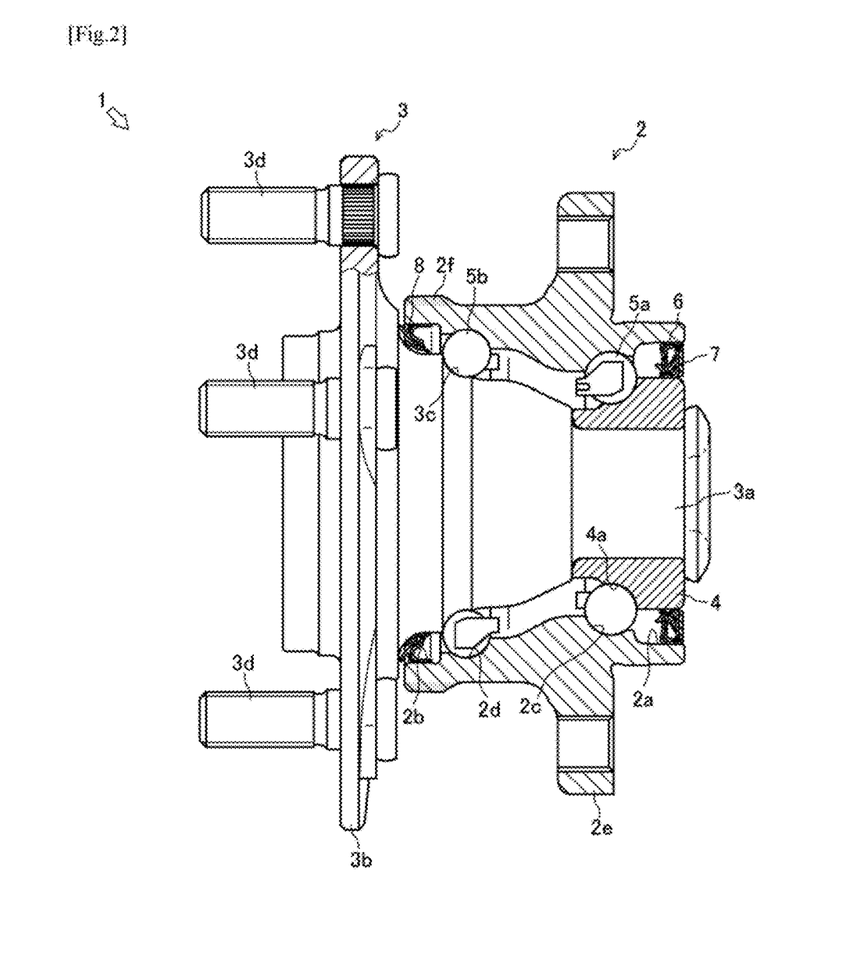
FIG. 2 is a cross-sectional view illustrating the overall configuration of the bearing device for wheels of the first embodiment according to the present invention (as seen in the direction of II-II in FIG. 1).

As illustrated in FIGS. 1 and 2, the bearing device for wheels 1 rotatably supports a wheel in a suspension device for a vehicle such as an automobile. The bearing device for wheels 1 is provided with an outer member 2, a hub ring 3, an inner race 4, a first-side ball row 5a (cf. FIG. 2) and a second-side ball row 5b (cf. FIG. 2) as two rows of rolling elements, a first-side (inner) sealing member 6 (cf. FIG. 2), and a second-side (outer) sealing member 8 (cf. FIG. 2).

As illustrated in FIG. 2, the outer member 2 supports an inner member (the hub ring 3 and the inner race 4). The outer member 2 is made of medium/high-carbon steel containing 0.40 wt % to 0.80 wt % of carbon such as S53C that is provided substantially cylindrically. At a first-side (inner) tip of the outer member 2, a first-side opening 2a in which the first-side sealing member 6 can be fitted is provided. At a second-side (outer) tip of the outer member 2, a second-side opening 2b in which the second-side sealing member 8 can be fitted is provided. Along an inner periphery of the outer member 2, an annular outer rolling surface 2c on the first side and an annular outer rolling surface 2d on the second side are provided in parallel to each other in a circumferential direction. The outer rolling surface 2d on the second side is formed to have a pitch diameter that is larger than a pitch diameter of the outer rolling surface 2c on the first side. Each of the outer rolling surface 2c on the first side and the outer rolling surface 2d on the second side are provided with a hardened layer treated by induction hardening to have surface hardness in a range from 58 HRC to 64 HRC. Around an outer periphery of the outer member 2, a vehicle body mounting flange 2e for attachment to a knuckle of the suspension device that is not shown is integrally provided.

The hub ring 3 that constitutes the inner member rotatably supports a wheel of the vehicle that is not shown. The hub ring 3 is made of medium/high-carbon steel containing 0.40 wt % to 0.80 wt % of carbon such as S53C that is formed into a bottomed cylindrical shape. At a first-side (inner) tip of the hub ring 3, a small-diameter stepped portion 3a whose diameter is reduced to the outer periphery is provided. At a second-side (outer) tip of the hub ring 3, a wheel mounting flange 3b for attachment to the wheel is integrally provided. The wheel mounting flange 3b is provided, along its circumference, with hub bolts 3d at regular intervals. Further, along an outer periphery of the hub ring 3 on the second side, an annular inner rolling surface 3c is provided in the circumferential direction.

The inner race 4 that constitutes the inner member is press fitted in the small-diameter stepped portion 3a at a first-side tip of the hub ring 3. The inner race 4 is made of high carbon-chromium bearing steel such as SUJ2, and treated by immersion quenching to its core portion to have hardness in a range from 58 HRC to 64 HRC. Around an outer periphery of the inner race 4, an annular inner rolling surface 4a is provided in the circumferential direction. The inner race 4 is integrally secured to the first-side tip of the hub ring 3, with predetermined precompression being applied by press fitting. In other words, the inner rolling surface 4a is configured by the inner race 4 on the first side of the hub ring 3. The hub ring 3 is treated by induction hardening from the small-diameter stepped portion 3a on the first side to the inner rolling surface 3c on the second side to have surface hardness in a range from 58 HRC to 64 HRC. With this, the hub ring 3 has sufficient mechanical strength against a rotary bending load applied to the wheel mounting flange 3b, and durability of the hub ring 3 improves. The hub ring 3 is positioned such that the inner rolling surface 4a provided for the inner race 4 at the first-side tip faces the outer rolling surface 2c of the outer member 2 on the first side, and the inner rolling surface 3c provided on the second side faces the outer rolling surface 2d of the outer member 2 on the second side.

The first-side ball row 5a and the second-side ball row 5b as the rows of rolling elements rotatably support the hub ring 3. Each of the first-side ball row 5a and the second-side ball row 5b are configured such that a plurality of balls as rolling elements are retained by a retainer in an annular manner. The first-side ball row 5a and the second-side ball row 5b are made of high carbon-chromium bearing steel such as SUJ2, and treated by immersion quenching to its core portion to have hardness in a range from 58 HRC to 64 HRC. The second-side ball row 5b is configured to have a pitch diameter that is larger than a pitch diameter of the first-side ball row 5a. The first-side ball row 5a is disposed in a rollable manner between the inner rolling surface 4a provided for the inner race 4 and the outer rolling surface 2c, facing the inner rolling surface 4a, of the outer member 2 on the first side. The second-side ball row 5b is disposed in a rollable manner between the inner rolling surface 3c provided for the hub ring 3 and the outer rolling surface 2d, facing the inner rolling surface 3c, of the outer member 2 on the second side. In other words, the first-side ball row 5a and the second-side ball row 5b rotatably support the hub ring 3 and the inner race 4 with respect to the outer member 2. In the bearing device for wheels 1, the outer member 2, the hub ring 3, the inner race 4, the first-side ball row 5a, and the second-side ball row 5b constitute a multi-row angular contact ball bearing. It should be noted that, in this embodiment, the bearing device for wheels 1 is provided with, but not limited to, a multi-row angular contact ball bearing, and the bearing device for wheels 1 may be provided with a multi-row tapered roller bearing or the like. Further, in this embodiment, the bearing device for wheels 1 is configured as the bearing device for wheels 1 having, but not limited to, a third-generation structure in which the inner rolling surface 3c of the first-side ball row 5a is directly formed around the outer periphery of the hub ring 3, and the bearing device for wheels 1 may have a second-generation structure in which a pair of inner races 4 are secured by press fitting to the hub ring 3.

The first-side (inner) sealing member 6 blocks a gap between the outer member 2 and the inner race 4. The first-side sealing member 6 is provided with a substantially cylindrical sealing plate and a substantially cylindrical slinger. The first-side sealing member 6 is configured such that a plurality of first-side sealing lips made of a synthetic rubber such as NBR (acrylonitrile-butadiene rubber) are adhered by cure adhesion to a sealing plate made of a ferritic stainless steel plate (such as JIS SUS430 series) or the like. The slinger is formed of a steel plate that is equivalent to the sealing plate. A magnetized body 7 that constitutes an encoder is adhered to the outside (on the inner side) of the slinger. In the first-side sealing member 6, the sealing plate is fitted into the first-side opening 2a of the outer member 2 and the slinger is fitted into the inner race 4 to thereby provide a pack seal. The first-side sealing member 6 is slidable with respect to the slinger by bringing the first-side sealing lips of the sealing plate into contact with the slinger via an oil film. With this, the first-side sealing member 6 prevents leakage of lubricating grease through the first-side opening 2a of the outer member 2, and entrance of rain water or dust from outside.

The second-side (outer) sealing member 8 blocks a gap between the outer member 2 and the hub ring 3. The second-side sealing member 8 is provided such that a plurality of second-side sealing lips made of synthetic rubber such as nitrile rubber are integrally joined by cure adhesion to a cored bar having a substantially cylindrical shape. The second-side sealing member 8 has a cylindrical portion that is fitted into the second-side opening 2b of the outer member 2, and the plurality of second-side sealing lips are brought into contact with the outer periphery of the hub ring 3. The second-side sealing member 8 is slidable with respect to the hub ring 3 by bringing the second-side sealing lips into contact with the outer periphery of the hub ring 3 via an oil film. With this, the second-side sealing member 8 prevents leakage of lubricating grease through the second-side opening 2b of the outer member 2, and entrance of rain water or dust from outside.

In the bearing device for wheels 1 as described above, a multi-row angular contact ball bearing is configured by the outer member 2, the hub ring 3, the inner race 4, the first-side ball row 5a, and the second-side ball row 5b, and the hub ring 3 is rotatably supported by the outer member 2 via the first-side ball row 5a and the second-side ball row 5b. Further, in the bearing device for wheels 1, the gap between the first-side opening 2a of the outer member 2 and the inner race 4 is blocked by the first-side sealing member 6, and the gap between the second-side opening 2b of the outer member 2 and the hub ring 3 is blocked by the second-side sealing member 8. With this, the bearing device for wheels 1 is configured so that the hub ring 3 supported by the outer member 2 is rotatable while leakage of lubricating grease from inside and entrance of rain water or dust from outside are prevented.

Next, a shape of the outer member 2 will be described in detail with reference to FIG. 3. Along the inner periphery of the outer member 2 that is substantially cylindrically formed, the annular outer rolling surface 2c on the first-side on which the first-side ball row 5a rolls is provided near the first-side opening 2a, and the annular outer rolling surface 2d on the second side on which the second-side ball row 5b rolls is provided near the second-side opening 2b. The outer rolling surface 2d on the second side has a pitch diameter that is larger than a pitch diameter of the outer rolling surface 2c on the first side. In other words, an inner perimeter of the outer member 2 is provided such that an inner diameter of the second-side opening 2b for which the outer rolling surface 2d on the second side is provided is larger than an inner diameter of the first-side opening 2a.

Figure 3:
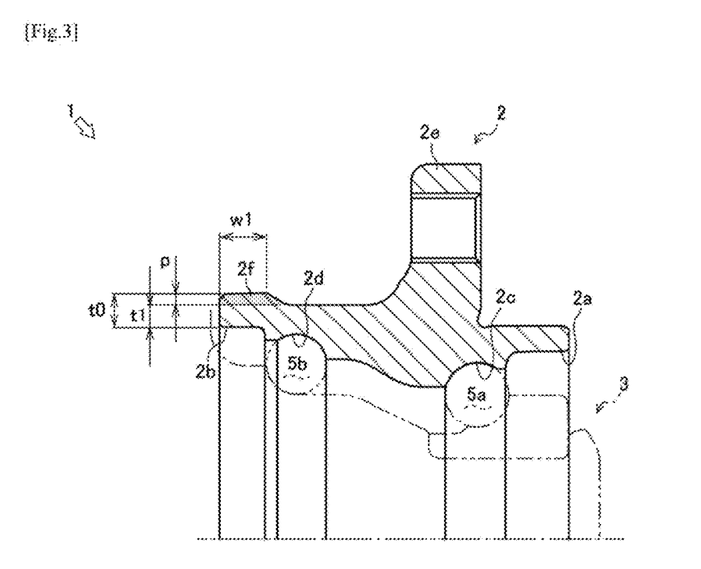
FIG. 3 is an enlarged partial cross-sectional view illustrating a shape of an outer member of the bearing device for wheels of the first embodiment according to the present invention.

As illustrated in FIG. 3, along the outer periphery of the outer member 2 that is substantially cylindrically formed, the vehicle body mounting flange 2e for attachment to the knuckle of the suspension device that is not shown is provided near the outer rolling surface 2c on the first side. Further, a belt-like portion 2f (shaded area) is provided near the outer rolling surface 2d on the second side of the outer periphery of the outer member 2. The belt-like portion 2f is configured as a belt-like portion with a predetermined belt width w1 projecting in a radial direction by a predetermined projecting amount p from the second-side tip of the outer member 2. The belt-like portion 2f is provided entirely over the second-side tip of the outer periphery of the outer member 2 (cf., shaded areas in FIGS. 1 and 2).

The belt-like portion 2f is configured to have the belt width w1 so that a portion of which thickness t representing a distance in the radial direction between the outer periphery and the inner periphery is smaller than a reference value t0 can be covered in an area from the second-side tip of the outer member 2 to a portion facing the outer rolling surface 2d on the second side. Further, the belt-like portion 2f is configured to have the projecting amount p with which the thickness t of the outer member 2 that is smaller than the reference value t0 becomes equal to or greater than the reference value t0. According to this embodiment, the outer periphery of the outer member 2 is provided with the belt-like portion 2f with the belt width w1 and the projecting amount p so as to cover a portion near the second-side opening 2b of which thickness t is a thickness t1 that is smaller than the reference value t0. With this, the thickness of the portion with the thickness t1 of the outer member 2 in the area from the second-side tip to the outer rolling surface 2d on the second side becomes equal to or greater than the reference value t0 (t1+p≥t0), and therefore an increase in an overall weight is minimized while ensuring stiffness above a certain level.

As described above, an area of the outer member 2 of the bearing device for wheels 1 from the first-side opening 2a to the outer rolling surface 2c on the first side is secured to the knuckle of the vehicle that is not shown via the vehicle body mounting flange 2e, and therefore bearing stiffness above a certain level is ensured for this area. On the other hand, for the area of the outer member 2 of the bearing device for wheels 1 from the second-side opening 2b to the outer rolling surface 2d on the second side, bearing stiffness above a certain level is ensured by the belt-like portion 2f. Therefore, with the bearing device for wheels 1, even if a radial load or an axial load increases, it is possible to reduce an amount of deformation of the area of the outer member 2 from the second-side opening 2b on the second side to the outer rolling surface 2d on the second side. In other words, with the bearing device for wheels 1, by providing the belt-like portion 2f it is possible to suppress deterioration in rolling surface roundness of the outer rolling surface 2d due to deformation of the second-side opening 2b of the outer member 2. Further, in the bearing device for wheels 1, the belt-like portion 2f mainly covers the portion of the outer member 2 including the area from the second-side opening 2b on the second side to the outer rolling surface 2d on the second side and having thickness t smaller than the reference value t0. In other words, in the bearing device for wheels 1, the belt-like portion 2f is provided only at a portion that influences deformation of the second-side opening 2b of the outer member 2. With this, while an increase of an overall weight is minimized, an amount of deformation of the second-side opening 2b of the outer member 2 can be reduced, and deterioration in rolling fatigue life can be prevented.

Next, with reference to FIGS. 4 and 5, a bearing device for wheels 9 as a second embodiment of the bearing device for wheels according to the present invention will be described. It should be noted that, bearing devices for wheels according to embodiments described hereinafter are considered as replacements for the bearing device for wheels 1 illustrated in FIGS. 1 to 3, and like components are indicated by like names, figures, and reference numbers used in these drawings. Further, for the embodiments described hereinafter, differences will be mainly described, and portions that are the same as those in the embodiments already described will not be described redundantly.

Figure 4:
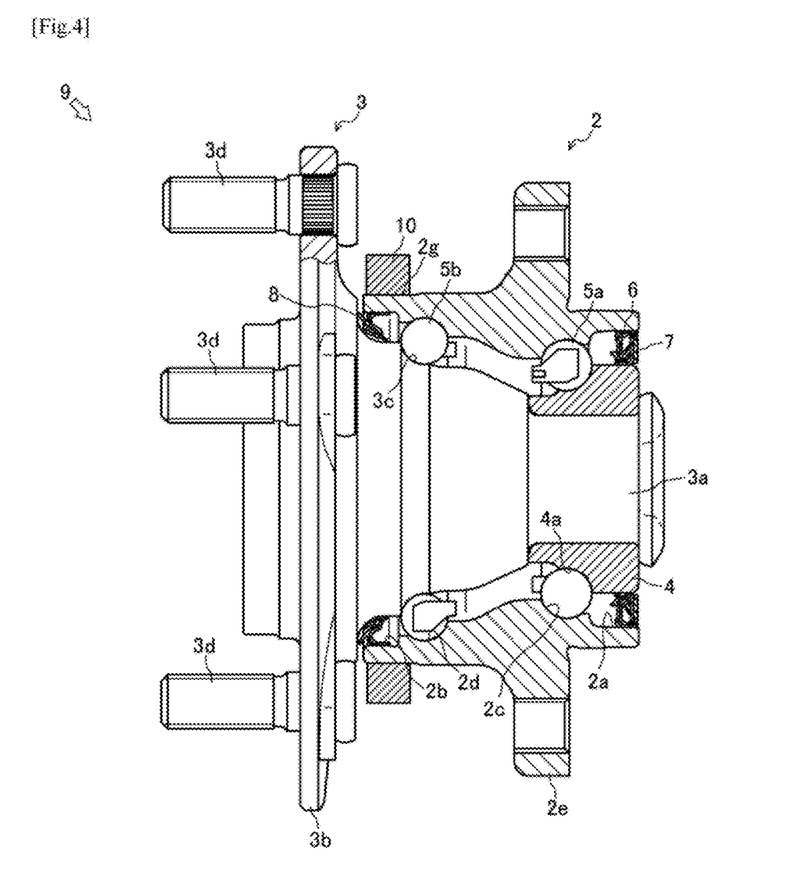
FIG. 4 is a cross-sectional view illustrating an overall configuration of a bearing device for wheels of a second embodiment according to the present invention.

As illustrated in FIG. 4, the bearing device for wheels 9 is provided with the outer member 2, the hub ring 3, the inner race 4, the first-side ball row 5a and the second-side ball row 5b as two rows of rolling elements, the first-side sealing member 6, the second-side sealing member 8, and a circular ring member 10 as the belt-like portion.

Around the outer periphery of the outer member 2 that is substantially cylindrically formed, the vehicle body mounting flange 2e for attachment to the knuckle of the suspension device that is not shown is provided near the outer rolling surface 2c on the first side. Further, a circular ring fitting portion 2g is provided near a portion from a second-side tip surface of the outer periphery of the outer member 2 to the outer rolling surface 2d on the second side. The circular ring fitting portion 2g is configured to have a diameter D with accuracy with which the circular ring member 10 can be press-fitted into the second-side tip of the outer member 2 (cf. FIG. 5).

Figure 5:
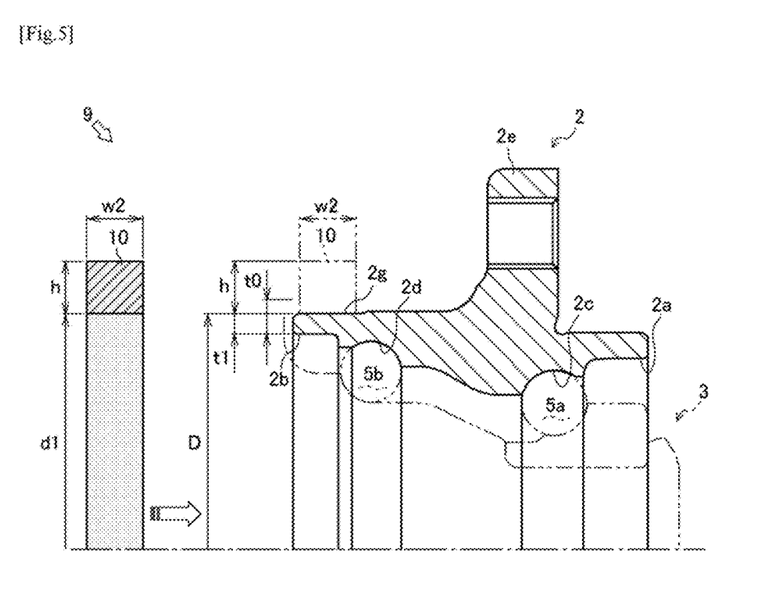
FIG. 5 is an enlarged partial cross-sectional view illustrating shapes of an outer member and a circular ring of the bearing device for wheels of the second embodiment according to the present invention.

As illustrated in FIG. 5, the circular ring member 10 fastens the outer periphery of the outer member 2 to improve stiffness of the outer member 2. The circular ring member 10 made of steel is configured to have an inner diameter d1 with accuracy with which the circular ring member 10 can be press-fitted into the circular ring fitting portion 2g. The inner diameter d1 is smaller than the diameter D of the circular ring fitting portion 2g of the outer member 2. The circular ring member 10 is press-fitted into the circular ring fitting portion 2g of the outer member 2 (cf. white arrows in FIGS. 4 and 5). The circular ring member 10 is configured to have a rectangular shape with a predetermined height h and a predetermined width w2 as viewed in an axial cross-section. The circular ring member 10 is configured to have the width w2 so that a portion of which thickness t of the outer member 2 is smaller than the reference value t0 can be overlapped by press-fitting in the area from the second-side tip of the outer member 2 to the portion facing the outer rolling surface 2d on the second side. Further, the circular ring member 10 is configured to have the height h with which the thickness t of the outer member 2 that is smaller than the reference value t0 becomes equal to or greater than the reference value t0. According to this embodiment, the outer periphery of the outer member 2 configured such that the circular ring member 10 having the predetermined the height h and the predetermined width w2 as viewed in the axial cross-section is press-fitted into the circular ring fitting portion 2g of the outer member 2, so as to cover the portion near the second-side opening 2b of which thickness t is the thickness t1 that is smaller than the reference value t0. With this, the portion with the thickness t1 of the outer member 2 in the area from the second-side tip to the outer rolling surface 2d on the second side projects by the height h, and the thickness of this portion becomes equal to or greater than the reference value t0 (t1+h≥t0). Therefore, stiffness of the circular ring member 10 is added, and an increase in an overall weight is minimized while ensuring stiffness above a certain level.

As described above, an area of the outer member 2 of the bearing device for wheels 9 from the first-side opening 2a to the outer rolling surface 2c on the first side is secured to the knuckle of the vehicle via the vehicle body mounting flange 2e, and therefore bearing stiffness above a certain level is ensured for this area. On the other hand, the area of the outer member 2 of the bearing device for wheels 9 from the second-side opening 2b to the outer rolling surface 2d on the second side is fastened by press-fitting of the circular ring member 10, and therefore bearing stiffness above a certain level is ensured for this area. Therefore, with the bearing device for wheels 9, even if a radial load or an axial load increases, it is possible to reduce an amount of deformation of the area of the outer member 2 from the second-side opening 2b on the second side to the outer rolling surface 2d on the second side. In other words, with the bearing device for wheels 9, by press-fitting the circular ring member 10 into the outer member 2, it is possible to suppress deterioration in rolling surface roundness of the outer rolling surface 2d due to deformation of the second-side opening 2b of the outer member 2. Further, with the bearing device for wheels 9, the circular ring member 10 overlaps with the portion of the outer member 2 including the area from the second-side opening 2b on the second side to the outer rolling surface 2d on the second side and having thickness t smaller than the reference value t0. In other words, the bearing device for wheels 9 is fastened by the circular ring member 10 only at the portion that influences deformation of the second-side opening 2b of the outer member 2. With this, while minimizing an increase of an overall weight, an amount of deformation of the second-side opening 2b of the outer member 2 can be reduced, and deterioration in rolling fatigue life can be prevented.

In the following, with reference to FIGS. 6 and 7, a bearing device for wheels 11 as a third embodiment of the bearing device for wheels according to the present invention will be described.

Figure 6:
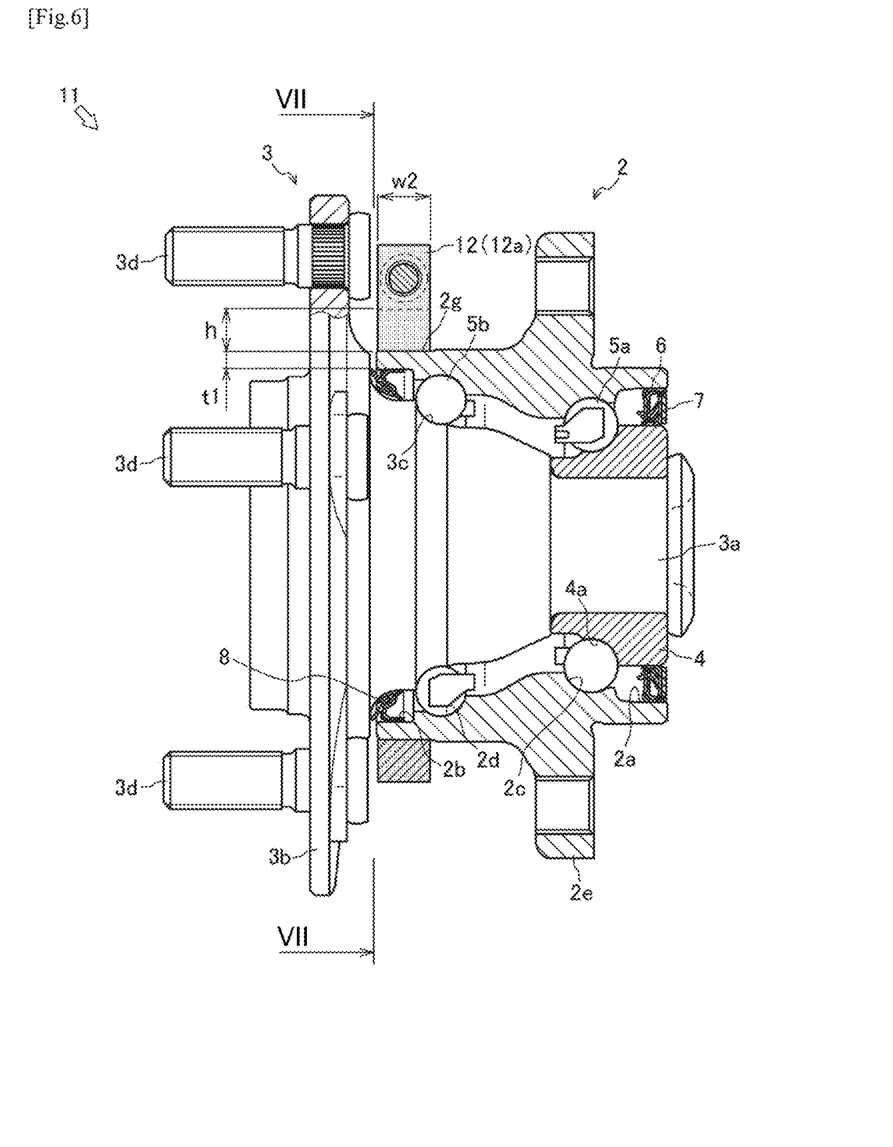
FIG. 6 is a cross-sectional view illustrating an overall configuration of a bearing device for wheels of a third embodiment according to the present invention.
Figure 7:
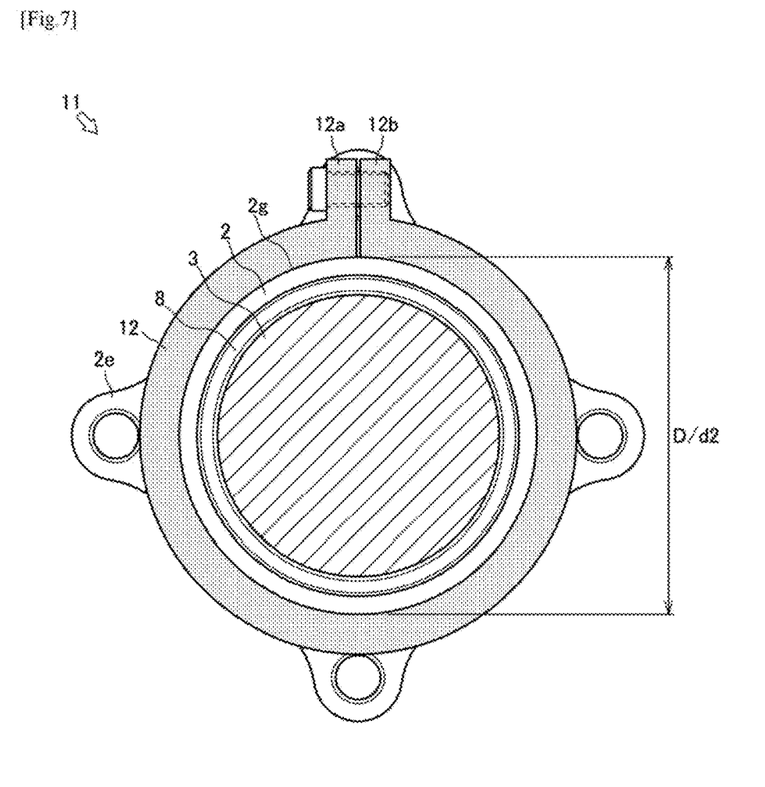
FIG. 7 is a cross-sectional view as seen in the direction of VII-VII in FIG. 6.

As illustrated in FIG. 6, the bearing device for wheels 11 is provided with the outer member 2, the hub ring 3, the inner race 4, the first-side ball row 5a and the second-side ball row 5b as two rows of rolling elements, and an open circular ring member 12 as the first-side sealing member, the second-side sealing member, and the belt-like portion (shaded areas in FIGS. 6 and 7).

Around the outer periphery of the outer member 2 that is substantially cylindrically formed, the vehicle body mounting flange 2e for attachment to the knuckle of the suspension device that is not shown is provided near the outer rolling surface 2c on the first side. Further, the circular ring fitting portion 2g is provided near the portion from the second-side tip surface of the outer periphery of the outer member 2 to the outer rolling surface 2d on the second side. The circular ring fitting portion 2g is configured to have a diameter D with accuracy with which the open circular ring member 12 can be fitted into the second-side tip of the outer member 2 (cf. FIG. 5).

As illustrated in FIG. 7, the open circular ring member 12 fastens the outer periphery of the outer member 2 to improve stiffness of the outer member 2. The open circular ring member 12 made of steel has an inner diameter d2 substantially identical to the diameter D of the circular ring fitting portion 2g of the outer member 2, and a part of the open circular ring member 12 is cut and open. Specifically, the open circular ring member 12 is in a C shape as viewed in the axial direction. Further, the open circular ring member 12 is configured to provide fastening means to reduce the inner diameter d2 by bringing a first-side tip and a second-side tip at the cut portion closer. The fastening means is constituted by a first-side projecting portion 12a and a second-side projecting portion 12b extending radially outward respectively from the first-side tip and the second-side tip at the cut portion. The first-side projecting portion 12a is provided with a hole, and the second-side projecting portion 12b is provided with a screw hole. The open circular ring member 12 is configured such that the first-side tip and the second-side tip can be fastened by fitting a screw into the first-side projecting portion 12a and the second-side projecting portion 12b.

The open circular ring member 12 is configured such that the first-side projecting portion 12a and the second-side projecting portion 12b that constitute the fastening means are fastened by a screw after being fitted into the circular ring fitting portion 2g of the outer member 2. The open circular ring member 12 is configured to have a rectangular shape with a predetermined height h and a predetermined width w2 as viewed in an axial cross-section. The open circular ring member 12 is configured to have the width w2 so that the portion of which thickness t of the outer member 2 is the thickness t1 that is smaller than the reference value t0 can be overlapped by fitting in the area from the second-side tip of the outer member 2 to the portion facing the outer rolling surface 2d on the second side. The open circular ring member 12 is configured such that the first-side tip and the second-side tip at the cut portion are brought closer to each other by fastening means. The inner diameter d2 of the open circular ring member 12 is reduced by bringing the first-side tip and the second-side tip. With this, stiffness of the open circular ring member 12 is added to the outer member 2 of the area from the second-side tip to the outer rolling surface 2d on the second side, and therefore an increase in an overall weight is minimized while ensuring stiffness above a certain level.

As described above, for the area of the outer member 2 of the bearing device for wheels 11 from the second-side opening 2b to the outer rolling surface 2d on the second side, bearing stiffness above a certain level is ensured by fastening of the fastening means of the open circular ring member 12. Therefore, with the bearing device for wheels 11, even if a radial load or an axial load increases, it is possible to reduce an amount of deformation of the area of the outer member 2 from the second-side opening 2b on the second side to the outer rolling surface 2d on the second side. In other words, with the bearing device for wheels 11, by fastening the outer member 2 by the open circular ring member 12, it is possible to suppress deterioration in rolling surface roundness of the outer rolling surface 2d due to deformation of the second-side opening 2b of the outer member 2. With this, while minimizing an increase of an overall weight, an amount of deformation of the opening of the outer member 2 can be reduced, and deterioration in rolling fatigue life can be prevented. Further, as the bearing device for wheels 11 is configured such that the open circular ring member 12 is fitted into the outer member 2, there is no restriction in mechanical processing of the outer member 2. With this, the bearing device for wheels 11 can suppress deterioration in productivity. Moreover, with the bearing device for wheels 11, the open circular ring member 12 is easily removable by loosening the screw of fastening means. With this, it is possible to facilitate maintenance of the bearing device for wheels 11. Furthermore, in order to attach and remove the hub bolt 3d, the outer member 2 is required to be configured to have an outer diameter smaller than a diameter of a ring inscribed in a head portion of the hub bolt 3d. However, as the bearing device for wheels 11 is provided with the open circular ring member 12 separately from the outer member 2, the open circular ring member 12 can be moved to a position that does not interfere attachment and removal of the hub bolt 3d. Therefore, in the bearing device for wheels 11, an outer diameter (d2+h) of the open circular ring member 12 can be made larger than the diameter of the ring inscribed in the head portion of the hub bolt 3d. In other words, in the bearing device for wheels 11, the outer diameter of the open circular ring member 12 can be set without restriction by the head portion of the hub bolt 3d, and therefore it is possible to effectively reduce an amount of deformation of the opening of the outer member 2, and to prevent deterioration in rolling fatigue life.

In the following, with reference to FIG. 8, a bearing device for wheels 13 as a fourth embodiment of the bearing device for wheels according to the present invention will be described.

Figure 8:
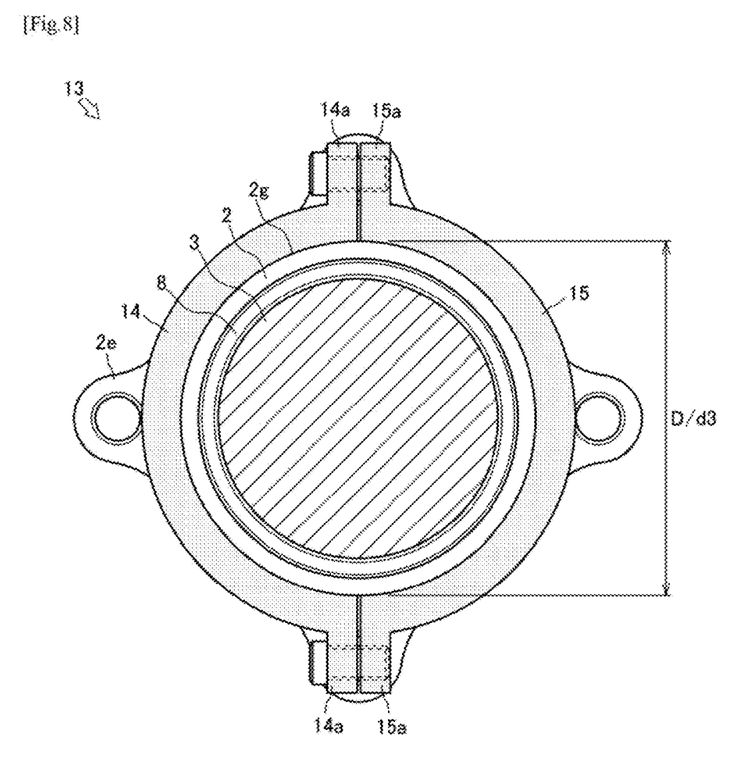
FIG. 8 is an axial cross-sectional view of a bearing device for wheels of a fourth embodiment according to the present invention.

The bearing device for wheels 13 is provided with a first-side arc member 14 and a second-side arc member 15 in a semi-circular shape as a belt-like portion configured by dividing the open circular ring member 12 of the bearing device for wheels 11 (a shaded area in FIG. 8).

Around the outer periphery of the outer member 2 that is substantially cylindrically formed, the circular ring fitting portion 2g is provided. The circular ring fitting portion 2g is configured to have the diameter D with accuracy with which the first-side arc member 14 and the second-side arc member 15 can be fitted into the second-side tip of the outer member 2.

The first-side arc member 14 and the second-side arc member 15 fasten the outer periphery of the outer member 2 to improve stiffness of the outer member 2. The first-side arc member 14 and the second-side arc member 15 that are made of steel are configured by a circular ring of an inner diameter d3 substantially identical to the diameter D of the circular ring fitting portion 2g of the outer member 2. Specifically, the first-side arc member 14 and the second-side arc member 15 constitute a circular ring by connecting to each other viewed in the axial direction. In this embodiment, the first-side arc member 14 and the second-side arc member 15 are configured to have the width w2 so that the portion of which thickness t of the outer member 2 is the thickness t1 that is smaller than the reference value t0 can be overlapped by fitting in the area from the second-side tip of the outer member 2 to the portion facing the outer rolling surface 2d on the second side (cf. FIG. 6). The first-side arc member 14 and the second-side arc member 15 are provided with fastening means for connecting to each other. On both ends of the first-side arc member 14, first-side projecting portions 14a extending radially outward are respectively provided as the fastening means. On both ends of the second-side arc member 15, the second-side projecting portions 15a extending radially outward are respectively provided as the fastening means. Each of the first-side projecting portions 14a is provided with a hole, and each of the second-side projecting portions 15a is provided with a screw hole. In other words, the first-side arc member 14 and the second-side arc member 15 are configured to be connected into a ring by the first-side projecting portions 14a and the second-side projecting portions 15a. It should be noted that, while the first-side arc member 14 and the second-side arc member 15 are configured by dividing a circular ring into two parts in this embodiment, the present invention is not limited to such an example, and the arc members may be configured by dividing a circular ring into three or more parts.

After the first-side arc member 14 and the second-side arc member 15 are fitted to the circular ring fitting portion 2g of the outer member 2, the first-side projecting portions 14a and the second-side projecting portions 15a are respectively fastened by screws. In other words, the first-side arc member 14 and the second-side arc member 15 are fitted to the outer member 2 in an annular manner. The inner diameter d3 of the circular ring constituted by the first-side arc member 14 and the second-side arc member 15 is reduced by connecting the first-side arc member 14 and the second-side arc member 1S. With this, stiffness of the first-side circular ring member 14 is added to the outer member 2 of the area from the second-side tip to the outer rolling surface 2d on the second side, and therefore an increase in an overall weight is minimized while ensuring stiffness above a certain level.

As described above, for the area of the outer member 2 of the bearing device for wheels 13 from the second-side opening 2b to the outer rolling surface 2d on the second side, bearing stiffness above a certain level is ensured by connecting and fastening the first-side arc member 14 and the second-side arc member 15. With this, while minimizing an increase of an overall weight, an amount of deformation of the second-side opening 2b of the outer member 2 can be reduced, and deterioration in rolling fatigue life can be prevented. Further, as the bearing device for wheels 13 is configured such that the first-side arc member 14 and the second-side arc member 15 are fitted into the outer member 2, there is no restriction in mechanical processing of the outer member 2. With this, the bearing device for wheels 13 can suppress deterioration in productivity. Moreover, in the bearing device for wheels 13, the first-side arc member 14 and the second-side arc member 15 is easily removable by removing the screws of fastening means. With this, it is possible to facilitate maintenance of the bearing device for wheels 13. Furthermore, similarly to the bearing device for wheels 11 of the third embodiment, as the external bearing device for wheels 13 is provided with the first-side arc member 14 and the second-side arc member 15 separately from the outer member 2, it is possible to make the diameter larger than the diameter of the ring inscribed in the head portion of the hub bolt 3d. In other words, in the bearing device for wheels 13, the outer diameter (d3+h) of a ring configured by the first-side arc member 14 and the second-side arc member 15 can be set without restriction by the head portion of the hub bolt 3d, and therefore it is possible to effectively reduce an amount of deformation of the opening of the outer member 2, and to prevent deterioration in rolling fatigue life.

The embodiments of the present invention are described above, but these embodiments are mere examples and may not restrict the present invention in any way. It should be appreciated that the present invention may be implemented in various manners without departing from the spirit of the present invention. The scope of the present invention is set forth in the appended claims, including any equivalents of the claims and any modification within the scope.

INDUSTRIAL APPLICABILITY

The present invention may be applied to bearing devices for wheels.

DESCRIPTION OF REFERENCE SIGNS

1: bearing device for wheels
2: outer member
2e: vehicle body mounting flange
2b: second-side opening
2f: belt-like portion
3: hub ring
3b: wheel mounting flange
4: inner race
5a: first-side ball row
5b: second-side ball row

The invention claimed is:

1. A bearing device for wheels, the bearing device comprising:
    an outer member having a vehicle body mounting flange integrally along an outer periphery, and a multi-row outer rolling surface along an inner periphery;
    an inner member having a hub ring and at least one inner race, the hub ring having a wheel mounting flange for attachment to a wheel integrally at one end and a small-diameter stepped portion extending axially around an outer periphery, the at least one inner race being press-fitted into the small-diameter stepped portion, the outer periphery being provided with a multi-row inner rolling surface facing the multi-row outer rolling surface; and
    multi-row rolling elements disposed in a rollable manner between the multi-row inner rolling surface and the multi-row outer rolling surface, wherein
    the multi-row rolling elements are balls,
    a row of the multi-row rolling elements on an outer side is configured to have a pitch diameter that is larger than a pitch diameter of a row of the multi-row rolling elements on an inner side, a belt-shaped portion having a predetermined width and extending in a radial direction is provided entirely over an outer peripheral portion of an opening of the outer member on an outer side.

2. The bearing device for wheels according to claim 1, wherein
the belt-shaped portion is configured by press-fitting a circular ring into the opening of the outer member, the circular ring having an inner diameter smaller than an outer diameter of the opening of the outer member.

3. The bearing device for wheels according to claim 2, wherein
the belt-shaped portion is configured by fitting the circular ring having fastening means into the opening of the outer member and securing the circular ring to the opening of the outer member by the fastening means, the circular ring being partially open, the fastening means bringing ends of the circular ring close to each other.

4. The bearing device for wheels according to claim 2, wherein
the belt-shaped portion is configured by fitting the circular ring having fastening means into the opening of the outer member and securing the circular ring to the opening of the outer member by the fastening means, the circular ring being divided into a plurality of parts, the fastening means bringing ends of the parts of the circular ring close to each other.

5. The bearing device for wheels according to claim 1, wherein
the belt-shaped portion is configured by fitting a circular ring having fastening means into the opening of the outer member and securing the circular ring to the opening of the outer member by the fastening means, the circular ring being partially open, the fastening means bringing ends of the circular ring close to each other.

6. The bearing device for wheels according to claim 1, wherein
the belt-shaped portion is configured by fitting a circular ring having fastening means into the opening of the outer member and securing the circular ring to the opening of the outer member by the fastening means, the circular ring being divided into a plurality of parts, the fastening means bringing ends of the parts of the circular ring close to each other.

* * * * *